J. R. FABER.
RUNNER.
APPLICATION FILED JAN. 21, 1910.
964,151.
Patented July 12, 1910.
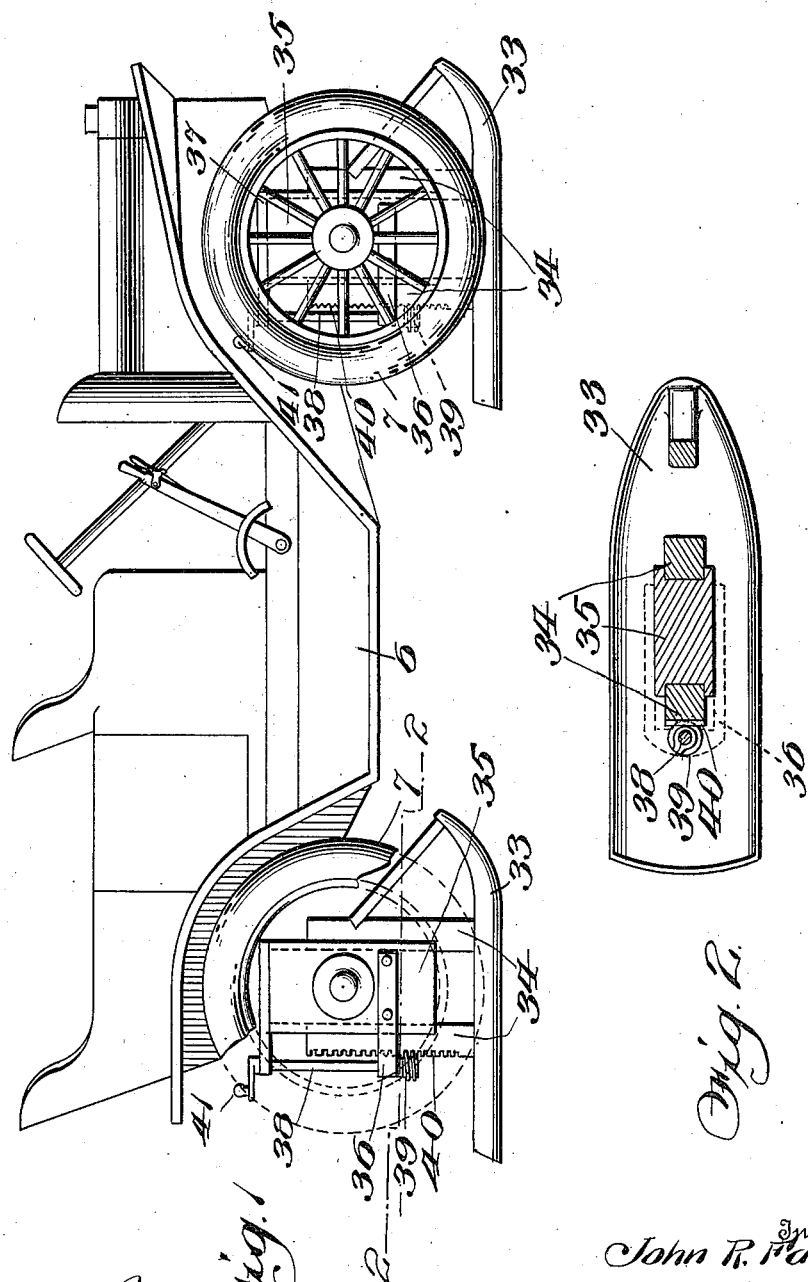
Inventor
John R. Faber.

UNITED STATES PATENT OFFICE.

JOHN R. FABER, OF MOUNT PLEASANT, MICHIGAN.

RUNNER.

964,151.          Specification of Letters Patent.     Patented July 12, 1910.

Original application filed October 5, 1909, Serial No. 521,170. Divided and this application filed January 21, 1910. Serial No. 539,231.

*To all whom it may concern:*

Be it known that I, JOHN R. FABER, a citizen of the United States, residing at Mount Pleasant, in the county of Isabella and State of Michigan, have invented certain new and useful Improvements in Runners, of which the following is a specification.

This application is a division of my pending application No. 521,170 filed Oct. 5, 1909.

The present invention relates to runners for supporting a motor vehicle or the like so that it will travel on snow or ice if and when desired.

It is intended that the machine will be provided with wheels on which it may travel on land, and also with runners which may be raised or lowered, so that when the vehicle is traveling on snow or ice the runners will be used, means being provided to lift the vehicle so that the wheels will be raised from the surface of the snow or ice and the vehicle will rest or travel on the runners.

The invention is illustrated in the accompanying drawings in which—

Figure 1 is a side view showing the runners and the means for raising and lowering the same. Fig. 2 is a horizontal section on the line 2—2 of Fig. 1.

Referring specifically to the drawings, 6 indicates the vehicle, properly constructed to support the seats and other parts of the body and provided with the usual wheels indicated at 7. Any suitable propelling means will be provided, the pending application above referred to illustrating one type.

For use on snow and ice I provide runners 33 on which are mounted spaced standards 34 which form guides for a sliding block or piece 35 bolted or otherwise fastened to the frame of the vehicle body 6, conveniently just within the axles. Each block 35 carries a lower bracket 36 and an upper bracket 37 having bearings for a shaft 38 at the lower end of which is a worm 39 which engages a rack 40 formed on the rear edge of the rear standard 34. At its upper end the shaft 38 is provided with a crank handle 41. When the crank 41 is turned the engagement of the roller with the rack will raise or lower the runner, and when the same is forced down sufficiently the body of the vehicle will be lifted and the wheels raised from the ground, the vehicle resting on the runners, on which it may be propelled over the surface of the snow or ice by any suitable means.

The invention is capable of application not only to motor vehicles, but also to wagons or the like and no limitation is implied with respect to the use of the device.

What I claim as new is:—

The combination of a runner, standards thereon, one standard having a rack, a block adapted to be fastened to the frame of the vehicle and slidable up and down between the standards, a crank shaft mounted on the block, and a worm on the shaft, engaging the rack to raise or lower the block when the shaft is turned.

In testimony whereof, I affix my signature in presence of two witnesses.

JOHN R. FABER.

Witnesses:
    DAVID CONWAY,
    GEORGE K. PECK.